(12) United States Patent
Kim et al.

(10) Patent No.: US 10,089,718 B2
(45) Date of Patent: Oct. 2, 2018

(54) USER ADAPTIVE IMAGE COMPENSATOR

(71) Applicant: Samsung Electronics Co., Ltd., Suwon-si, Gyeonggi-do (KR)

(72) Inventors: Byeoung-Su Kim, Hwaseong-si (KR); Du-Sic Yoo, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 199 days.

(21) Appl. No.: 15/175,010

(22) Filed: Jun. 6, 2016

(65) Prior Publication Data

US 2017/0024857 A1    Jan. 26, 2017

(30) Foreign Application Priority Data

Jul. 24, 2015   (KR) .................. 10-2015-0105073

(51) Int. Cl.
  *G06T 5/00*   (2006.01)
  *G06T 7/90*   (2017.01)

(52) U.S. Cl.
  CPC .............. *G06T 5/001* (2013.01); *G06T 7/90* (2017.01); *G06T 2207/20081* (2013.01)

(58) Field of Classification Search
  CPC ............. G06T 5/00; G06T 5/001; G06T 7/90
  See application file for complete search history.

(56) References Cited

U.S. PATENT DOCUMENTS

| | | | |
|---|---|---|---|
| 8,606,009 B2 * | 12/2013 | Sun | ............... G06T 5/50 382/169 |
| 8,610,738 B2 | 12/2013 | Choe et al. | |
| 8,611,421 B1 | 12/2013 | Efremov et al. | |
| 8,687,087 B2 | 4/2014 | Pertsel et al. | |
| 8,731,322 B2 | 5/2014 | Lee | |
| 8,737,764 B2 | 5/2014 | Kokemohr | |
| 8,982,963 B2 | 3/2015 | Gish et al. | |
| 9,031,320 B2 | 5/2015 | Tsai | |

(Continued)

FOREIGN PATENT DOCUMENTS

| | | |
|---|---|---|
| JP | 2006229460 A | 8/2006 |
| KR | 101389930 | 4/2014 |
| KR | 101448494 | 10/2014 |

*Primary Examiner* — Wesley J Tucker
(74) *Attorney, Agent, or Firm* — Renaissance IP Law Group LLP

(57) ABSTRACT

A user adaptive image compensator includes a feature extractor, a compensated image generator, an image selector, and a preference parameter updater. The feature extractor extracts features from an input image. The compensated image generator generates compensated preference parameters based on a preference parameter. The compensated image generator generates a plurality of compensated images by compensating the input image based on the compensated preference parameters. The image selector displays the compensated images to a user. The image selector outputs a selected compensated image, which is selected from the compensated images by the user, as an output image. The image selector outputs a selected compensated preference parameter from the compensated preference parameters and which corresponds to the selected compensated image. The preference parameter updater updates the preference parameter based on the selected compensated preference parameter and the extracted features.

18 Claims, 16 Drawing Sheets

(56) References Cited

U.S. PATENT DOCUMENTS

| | | | |
|---|---|---|---|
| 9,076,224 B1 | 7/2015 | Shah et al. | |
| 2007/0258656 A1* | 11/2007 | Aarabi | G06K 9/00228 |
| | | | 382/254 |
| 2009/0169073 A1* | 7/2009 | Areste | G06F 19/321 |
| | | | 382/128 |
| 2010/0053222 A1* | 3/2010 | Kerofsky | G09G 3/3406 |
| | | | 345/690 |
| 2013/0091430 A1 | 4/2013 | Zhai et al. | |
| 2014/0225941 A1 | 8/2014 | Van der Vleuten et al. | |
| 2015/0022687 A1 | 1/2015 | Galor | |
| 2015/0371422 A1* | 12/2015 | Kokemohr | G06T 11/60 |
| | | | 382/311 |

\* cited by examiner

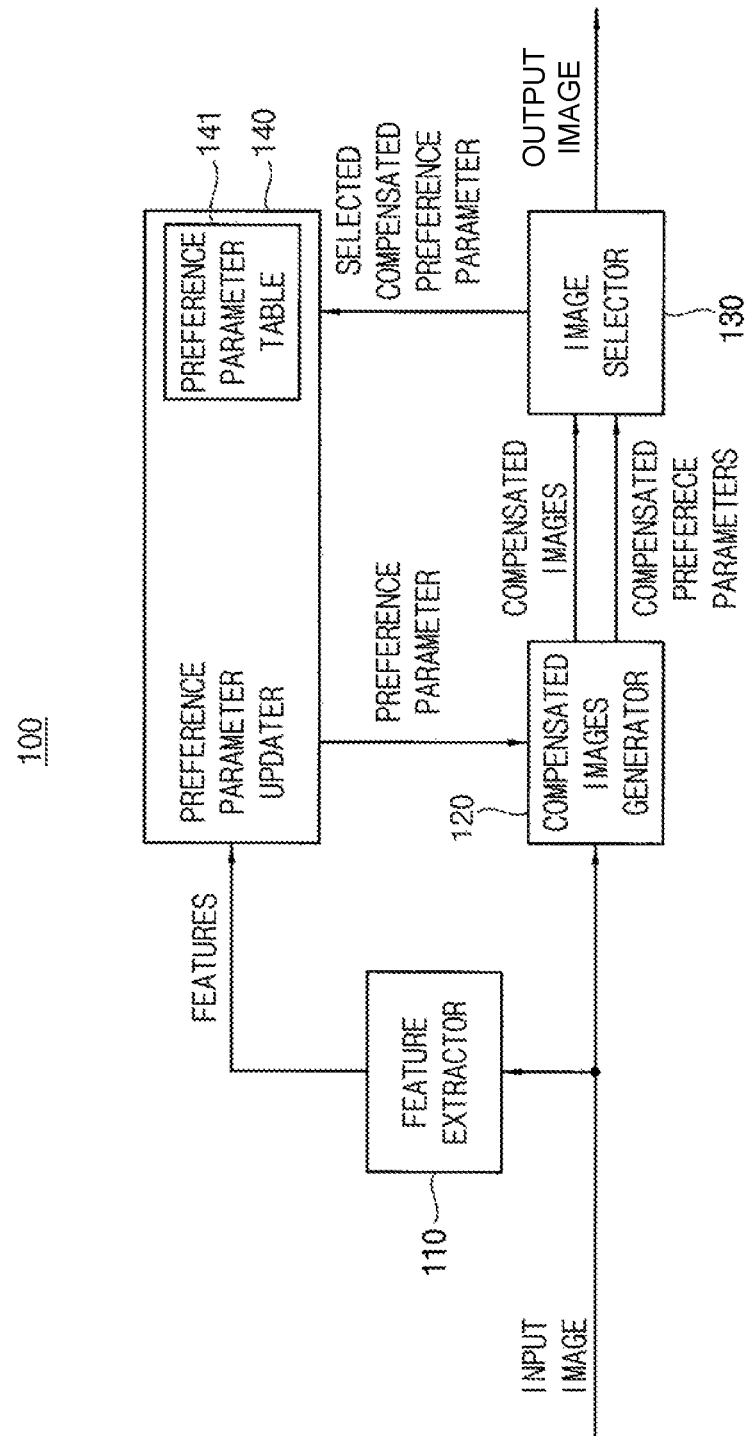

INPUT IMAGE2

| CONTENTS | PARAMETER |
|---|---|
| (SKY, FLOWER) | $P_1$ |
| (SKY, FACE, PLANT) | $P_2$ |
| ... | ... |

| CONTENTS | PARAMETER |
|---|---|
| (SKY, FLOWER) | $P_{1S}$, $P_{1F}$ |
| (SKY, FACE, PLANT) | $P_{2S}$, $P_{2F}$, $P_{2P}$ |
| ... | ... |

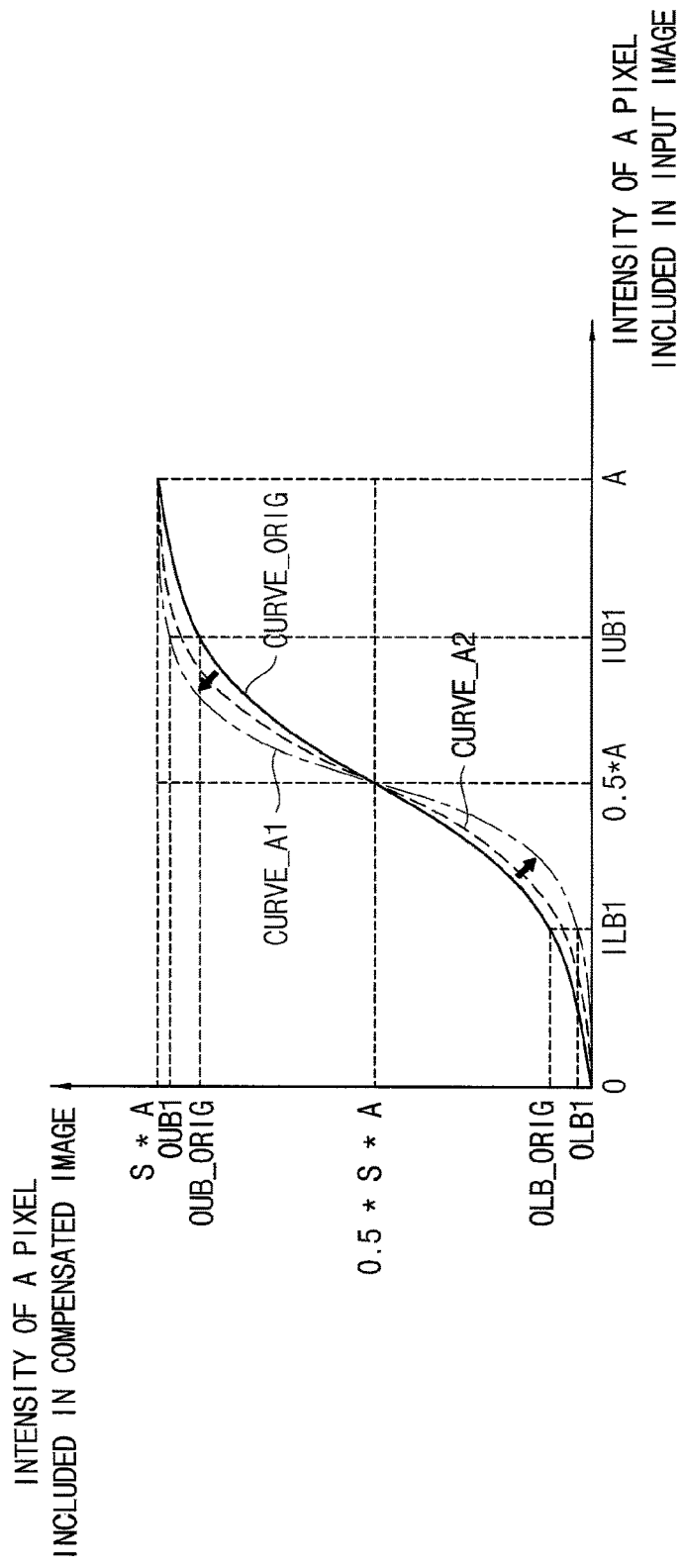

| USER | CONTENTS | PARAMETER |
|---|---|---|
| 1 | (SKY, FLOWER) | $P_{11}$ |
|  | (SKY, FACE, PLANT) | $P_{12}$ |
|  | ... | ... |
| 2 | (SKY, FLOWER) | $P_{21}$ |
|  | (SKY, FACE, PLANT) | $P_{22}$ |
|  | ... | ... |
| ... | ... | ... |

| USER | CONTENTS | PARAMETER |
|---|---|---|
| 1 | (SKY, FLOWER) | $P_{11S}$, $P_{11F}$ |
|  | (SKY, FACE, PLANT) | $P_{12S}$, $P_{12F}$, $P_{12P}$ |
|  | ... | ... |
| 2 | (SKY, FLOWER) | $P_{21S}$, $P_{21F}$ |
|  | (SKY, FACE, PLANT) | $P_{22S}$, $P_{22F}$, $P_{22P}$ |
|  | ... | ... |
| ... | ... | ... |

USER ADAPTIVE IMAGE COMPENSATOR

CROSS-REFERENCE TO RELATED APPLICATION

This U.S. Non-provisional application claims priority under 35 U.S.C. § 119 to Korean Patent Application No. 10-2015-0105073, filed on Jul. 24, 2015, in the Korean Intellectual Property Office (KIPO), the disclosure of which is incorporated by reference in its entirety herein.

BACKGROUND

Example embodiments relate generally to an image compensator, and more particularly to an image compensator that modifies images according to a preference of a user.

In general, image data generated by an image sensor is stored in storage after compensation according to a universal preference designed for a general user or based on a policy of a company that manufactures the image sensor. If size of the image data is greater than a size of the storage, a down-sizing procedure or a compressing procedure may be applied to the image data by the compensation.

Accordingly, a conventional image compensation method that is based on a universal preference of a general user may not be a suitable compensation of the image data according to a preference of an individual user.

SUMMARY

At least one example embodiment of the inventive concept provides an image compensator that learns preferences of an individual user and executes image compensation based on the learned preferences.

At least one example embodiment of the inventive concept provides an image compensator that respectively learns preferences of individual users of a plurality of users and executes image compensation based on the learned preference of a current user.

According to example embodiments, a user adaptive image compensator includes a feature extractor, a compensated image generator, an image selector, and a preference parameter updater. The feature extractor extracts features from an input image. The compensated image generator generates compensated preference parameters based on a preference parameter. The compensated image generator generates a plurality of compensated images of the input image based on the generated compensated preference parameters. The image selector displays the compensated images to a user. The image selector outputs a selected compensated image, which is selected by the user from the compensated images, as an output image. The image selector outputs a selected compensated preference parameter that corresponds to the selected compensated image. The preference parameter updater updates the preference parameter based on the selected compensated preference parameter and the extracted features.

In an example embodiment, the plurality of the compensated images may include first through (2N+1)-th compensated images, in which N is a natural number, and the compensated preference parameters may include first through (2N+1)-th compensated preference parameters. The compensated image generator may generate the (N+1)-th compensated preference parameter having a value of the preference parameter corresponding to a (N+1)-th compensation curve. The compensated image generator may generate the first through the N-th compensated preference parameters corresponding to first through N-th compensation curves and the (N+2)-th through the (2N+1)-th compensated preference parameters corresponding to the (N+2)-th through the (2N+1)-th compensation curves based on the preference parameter. The compensated image generator may generate the first through the (2N+1)-th compensated images by respectively applying the first through the (2N+1)-th compensation curves to the input image.

In an example embodiment, a K-th dynamic range, in which K is a natural number equal to or less than (2N+1), may be a ratio of a maximum intensity to a minimum intensity of data included in the K-th compensated image and the K-th dynamic range may be proportional to K.

In an example embodiment, the K-th compensated image, in which K is a natural number equal to or less than N, may be further compensated to a black color according to the K-th compensation curve in comparison to the (N+1)-th compensated image as K decreases. The L-th compensated image, in which L is a natural number that is equal to or larger than (N+2) and that is equal to or less than (2N+1), may be further compensated to a white color according to the L-th compensation curve in comparison to the (N+1)-th compensation image as L increases.

In an example embodiment, if the user selects the K-th compensated image, in which K is a natural number equal to or less than (2N+1), the image selector may output a compensated preference parameter corresponding to the K-th compensation curve as the selected compensated preference parameter, and the preference parameter updater may update the preference parameter as value generated by combining the preference parameter and the selected compensated preference parameter based on a value of a learning speed α.

In an example embodiment, the preference parameter updater may include a preference parameter table. The preference parameter table may include a plurality of contents corresponding to combinations of features that may be extracted from the input image as indices. The preference parameter table may store content preference parameters corresponding to the extracted features.

In an example embodiment, the preference parameter updater may store the updated preference parameter as a first content preference parameter of a first content corresponding to the extracted features in the preference parameter table. The preference parameter updater may read the first content preference parameter corresponding to the extracted features from the preference parameter table and may output the first content preference parameter as the preference parameter.

In an example embodiment, a type and a number of the extracted features may vary according to the input image.

In an example embodiment, the extracted features may be features of a portion of the input image such as a sky, a plant, a sea, or a human, or are features based on an entirety of the input image, such as brightness.

In an example embodiment, the preference parameter may include vectors representing a compensation curve describing a preference of the user.

According to example embodiments, a user adaptive image compensator includes a feature extractor, a compensated image generator, an image selector, and a preference parameter updater. The feature extractor extracts features from an input image. The compensated image generator generates compensated preference parameters based on an identification signal of a current user among a plurality of users and a preference parameter corresponding the extracted features. The compensated image generator generates a plurality of compensated images by compensating the input image based on the compensated preference parameters. The image selector displays the compensated images to the current user. The image selector outputs a selected compensated image that is selected from the compensated images by the current user, as an output image. The image selector outputs a selected compensated preference parameter from the compensated preference parameters and that corresponds to the selected compensated image. The preference parameter updater updates the preference parameter based on the selected compensated preference parameter, the extracted features, and the identification signal.

In an example embodiment, the plurality of the compensated images may include first through (2N+1)-th compensated images, in which N is a natural number, and the compensated preference parameters may include first through (2N+1)-th compensated preference parameters. The compensated image generator may generate the (N+1)-th compensated preference parameter having a value of the preference parameter corresponding to a (N+1)-th compensation curve. The compensated image generator may generate the first through the N-th compensated preference parameters corresponding to first through the N-th compensation curves and the (N+2)-th through the (2N+1)-th compensated preference parameters corresponding to the (N+2)-th through the (2N+1)-th compensation curves based on the preference parameter. The compensated image generator may generate the first through the (2N+1)-th compensated images by respectively applying the first through the (2N+1)-th compensation curves to the input images.

In an example embodiment, a K-th dynamic range, in which K is a natural number equal to or less than (2N+1), may be a ratio of a maximum intensity to a minimum intensity of data included in the K-th compensated image, and the K-th dynamic range may be proportional to K.

In an example embodiment, the K-th compensated image, in which K is a natural number equal to or less than N, may be further compensated to a black color according to the K-th compensation curve compared to the (N+1)-th compensated image as K decreases. The L-th compensated image, in which L is a natural number that is equal to or larger than (N+2) and that is equal to or less than (2N+1), may be further compensated to a white color according to the L-th compensation curve compared to the (N+1)-th compensation image as L increases.

In an example embodiment, if the current user selects the K-th compensated image, in which K is a natural number equal to or less than (2N+1), the image selector may output a compensated preference parameter corresponding to the K-th compensation curve as the selected compensated preference parameter, and the preference parameter updater may update the preference parameter as value generated by mixing the preference parameter and the selected compensated preference parameter based on a value of a learning speed α.

According to example embodiments, a user adaptive image compensator comprises a feature extractor, a compensated image generator, an image selector, and a preference parameter updater. The feature extractor may extract features from an input image. The compensated image generator may generate at least one compensated preference parameter based on a current preference parameter, and the compensated image generator may generate a plurality of compensated images of the input image based on the at least one generated compensated preference parameter. The image selector may display the plurality of compensated images and outputs a compensated image that has been selected by a user as an output image from the plurality of displayed compensated images. The image selector may also output a compensated preference parameter that corresponds to the selected compensated image. The preference parameter updater may update the current preference parameter based on the extracted features and the compensated preference parameter that corresponds to the selected compensated image.

In an example embodiment, the plurality of the compensated images may include first through (2N+1)-th compensated images, in which N is a natural number; the compensated preference parameters may include first through (2N+1)-th compensated preference parameters; the compensated image generator may further generate the (N+1)-th compensated preference parameter having a value of the preference parameter corresponding to a (N+1)-th compensation curve; the compensated image generator may further generate a first through an N-th compensated preference parameters corresponding to a first through an N-th compensation curves and an (N+2)-th through an (2N+1)-th compensated preference parameters respectively corresponding to the (N+2)-th through (2N+1)-th compensation curves based on the preference parameter; and the compensated image generator may further generate the first through (2N+1)-th compensated images by respectively applying the first through (2N+1)-th compensation curves to the input image.

In an example embodiment, a K-th dynamic range, in which K is a natural number equal to or less than (2N+1), may be a ratio of a maximum intensity to a minimum intensity of data included in the K-th compensated image, and the K-th dynamic range may be proportional to K.

In example embodiments, a K-th compensated image, in which K is a natural number equal to or less than N, may be further compensated to a black color according to the K-th compensation curve in comparison to the (N+1)-th compensated image as K decreases, and an L-th compensated image, in which L is a natural number that is equal to or greater than (N+2) and that is equal to or less than (2N+1), may be further compensated to a white color according to the L-th compensation curve compared to the (N+1)-th compensation image as L increases.

In example embodiments, if the user selects a K-th compensated image, in which K is a natural number equal to or less than (2N+1), the image selector may further output a compensated preference parameter corresponding to the K-th compensation curve as the selected compensated preference parameter, and the preference parameter updater may further update the current preference parameter to be a value generated by combining the preference parameter and the selected compensated preference parameter based on a learning speed value α.

In example embodiments, the preference parameter updater may include a preference parameter table; the preference parameter table may include a plurality of content entries corresponding to combinations of features that may be extracted from the input image as indices; and the preference parameter table may store stores content preference parameters corresponding to the extracted features.

In example embodiments, the preference parameter updater may further store the updated preference parameter as a first content preference parameter of a first content entry corresponding to the extracted features in the preference parameter table, and the preference parameter updater may further read the first content preference parameter corresponding to the extracted features from the preference parameter table and output the first content preference parameter as the current preference parameter.

In example embodiments, a type and a number of the extracted features may vary according to the input image.

In example embodiments, the extracted features may be features of a portion of the input image, or are features based on an entirety of the input image.

In example embodiments, the preference parameter may include vectors representing a compensation curve that is based on a preference of the user.

BRIEF DESCRIPTION OF THE DRAWINGS

Example embodiments of the inventive concept will be more clearly understood from the following detailed description taken in conjunction with the accompanying drawings.

FIG. 1 is a block diagram illustrating a user adaptive image compensator according to an example embodiment.

FIGS. 4A and 4B are diagrams illustrating example embodiments of a preference parameter table of the preference parameter updater included in the user adaptive image compensator of FIG. 1.

FIGS. 5A and 5B are graphs illustrating compensation curves applied to the compensated images of FIG. 1 according to an example embodiment.

FIGS. 9A and 9B are diagrams illustrating example embodiments of the preference parameter table of the preference parameter updater included in the user adaptive image compensator of FIG. 8.

DETAILED DESCRIPTION OF THE EMBODIMENTS

Figure 2A:
FIGS. 2A and 2B are diagrams illustrating an input image of FIG. 1 and features included in the input image.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a user adaptive image compensator according to an example embodiment.

Referring to FIG. 1, the user adaptive image compensator 100 includes a feature extractor 110, a compensated image generator 120, an image selector 130, and a preference parameter updater 140.

The feature extractor 110 extracts features (FEATURES) from an input image (INPUT IMAGE (II)). In an example embodiment, the extracted features may be features of a portion of the input image II, such as a sky, a plant, a sea, or a human. In this case, the feature extractor 110 may store masks corresponding to pre-defined features. The feature extractor 110 may select one mask among the stored masks and may determine whether the input image II includes a feature corresponding to the selected mask based on the result of convolution of the selected mask and the input image II. If the convolution is done for all masks, the feature extractor 110 may determine whether the input image II includes features corresponding to any of the respective masks. In another example embodiment, the extracted features may be features relating to the entirety of the input image II, such as brightness. In this case, the feature extractor 110 may extract an average value of luminance as brightness for the pixel data included in the entire input image II.

The feature extractor 110 may alternatively extract the features included in the input image II by another method than the method described herein. In an example embodiment, the type and number of the extracted features may vary according to the input image II.

The extracted features from the input image II will be described with the references to FIGS. 2A and 2B.

The compensated image generator 120 generates compensated preference parameters (COMPENSATED PREFERENCE PARAMETERS (CPP)) based on a preference parameter (PREFERENCE PARAMETER (PP)). The compensated image generator 120 generates a plurality of compensated images (COMPENSATED IMAGES (CI)) by compensating the input image II based on the compensated preference parameters CPP.

The plurality of the compensated images CI may include first through (2N+1) compensated images, in which N is a natural number. The compensated preference parameters CPP may include first through (2N+1) compensated preference parameters. The compensated image generator 120 may generate the (N+1) compensated preference parameters having a value of the preference parameter PP corresponding to a (N+1)-th compensation curve. The compensated image generator 120 may generate the first through the N-th compensated preference parameters corresponding to first through the N-th compensation curves and the (N+2)-th through the (2N+1)-th compensated preference parameters corresponding to the (N+2)-th through the (2N+1)-th compensation curves based on the preference parameter PP.

In a first example embodiment, a K-th dynamic range, in which K is a natural number equal to or less than (2N+1), may be a ratio of a maximum intensity to a minimum intensity of data included in the K-th compensated image, and in which the K-th dynamic range may be proportional to K. The first example embodiment will be described with the references to FIGS. 8 and 9. In another example embodiment, the K-th dynamic range may be inversely proportional to K.

In a second example embodiment, the L-th compensated image, in which L is a natural number equal to or less than N, may be further compensated to a black color according to the L-th compensation curve compared to the (N+1)-th compensated image as L decreases. The M-th compensated image, in which M is a natural number that is equal to or greater than (N+2) and that is equal to or less than (2N+1), may be further compensated to a white color according to the M-th compensation curve compared to the (N+1)-th compensation image as M increases. The second example embodiment will be described with the references to FIGS. 10 and 11. In another embodiment, color direction of the compensation may be opposite to the description provided herein, that is, in the color direction operations described, the black color and the white color may be exchanged.

The image selector 130 displays the compensated images CI to a user. The image selector 130 outputs a selected compensated image, which is selected by the user and output as an output image (OUTPUT IMAGE (OI)). The image selector 130 outputs a selected compensated preference parameter (SELECTED COMPENSATED PREFERENCE PARAMETER (SCPP)), which corresponds to the selected compensated image among the compensated preference parameters CPP. For example, if the user selects the K-th compensated image, in which K is a natural number equal to or less than (2N+1), the image selector 130 may output a compensated preference parameter corresponding to the K-th compensation curve as the selected compensated preference parameter SCPP and may output the K-th compensated image as the output image OI.

The preference parameter updater 140 updates the preference parameter PP based on the selected compensated preference parameter SCPP and the extracted features. The preference parameter updater 140 may update the preference parameter PP as a value generated by combining the preference parameter PP and the selected compensated preference parameter SCPP based on a value of a learning speed α, which is described below.

Operation of the image selector 130 and the preference parameter updater 140 will be described with the reference to FIG. 7.

Figure 2B:
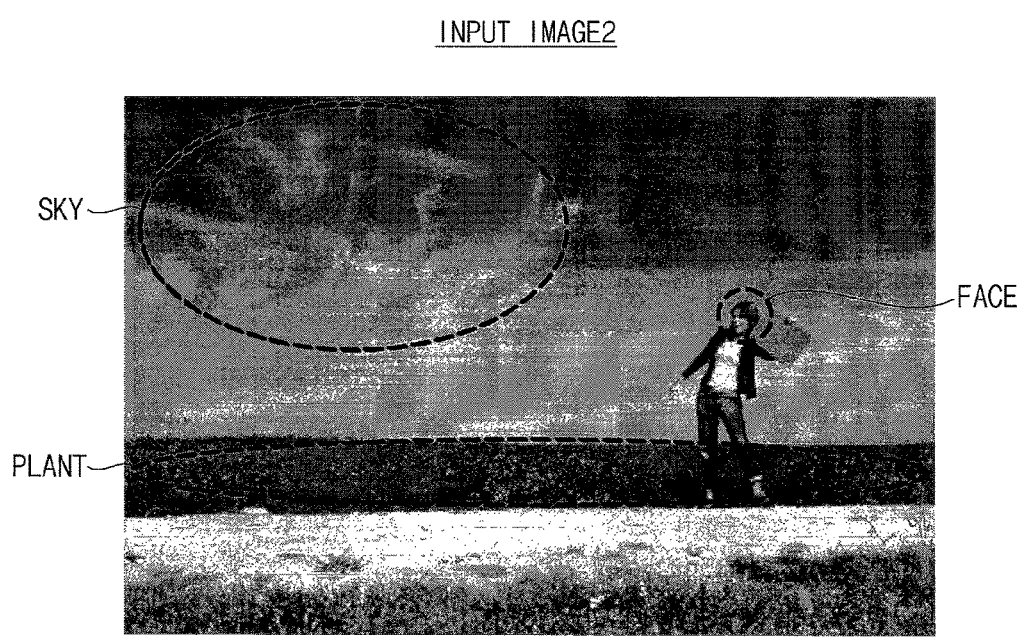

FIGS. 2A and 2B are diagrams illustrating the input image of FIG. 1 and features included in the input image.

FIG. 2A shows a situation in which the feature extractor 110 extracts a sky feature SKY and a flower feature FLOWER from a first input image INPUT IMAGE 1. FIG. 2B shows a situation in which the feature extractor 110 extracts a sky feature SKY, a face feature FACE, and a plant feature PLANT from a second input image INPUT IMAGE 2.

Figure 3A:
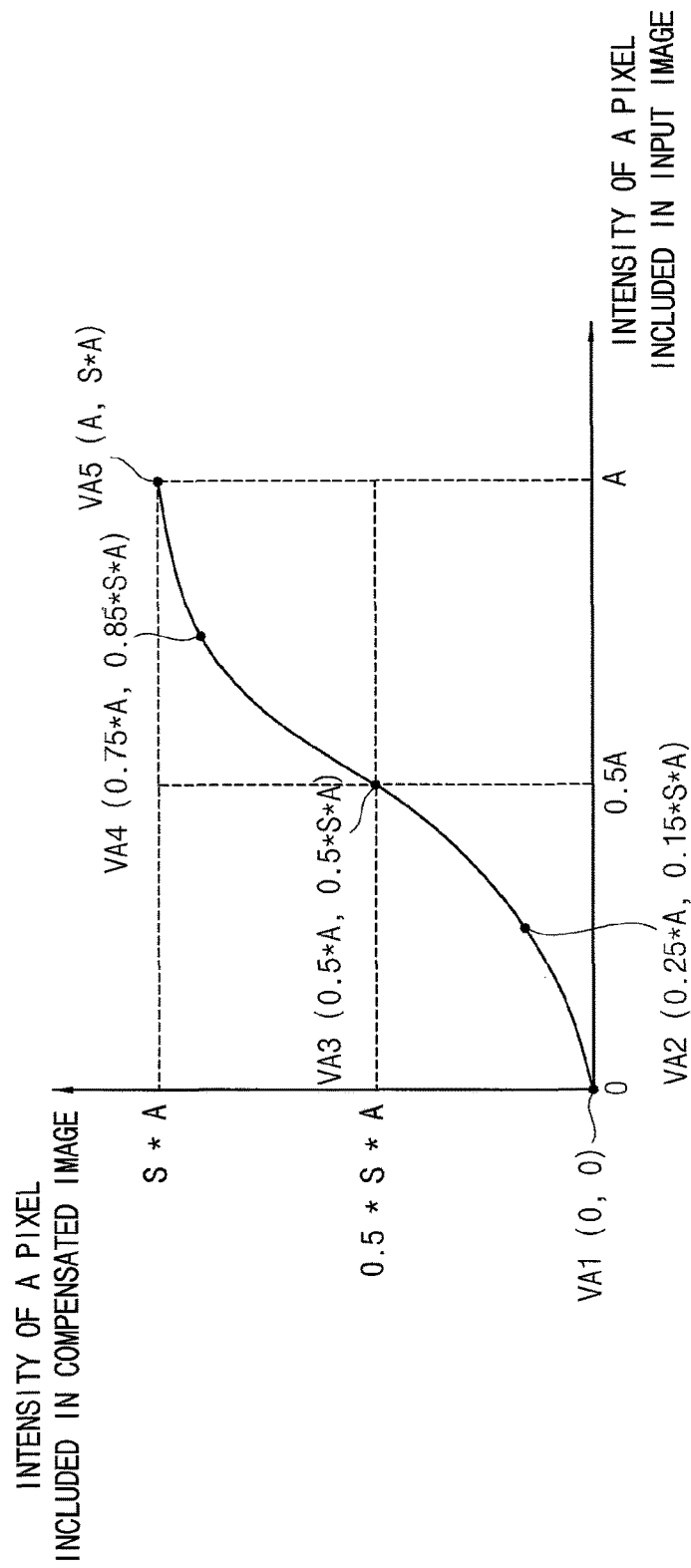
FIGS. 3A and 3B are graphs respectively illustrating an (N+1)-th compensation curve of FIG. 1 and preference parameters corresponding to the (N+1)-th compensation curve.
Figure 3B:
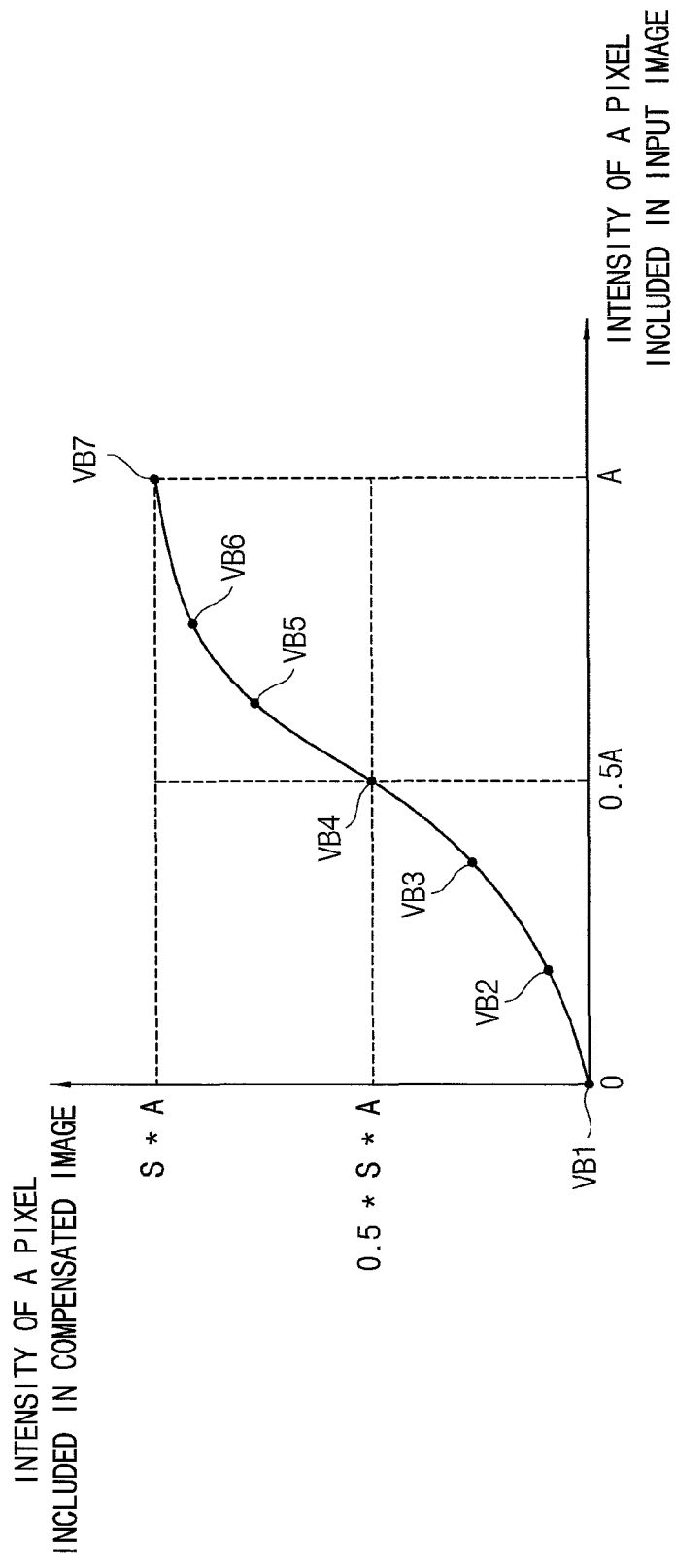

FIGS. 3A and 3B are graphs respectively illustrating an (N+1)-th compensation curve of FIG. 1 and preference parameters corresponding to the (N+1)-th compensation curve.

Referring to FIGS. 3A and 3B, the (N+1)-th compensation curve corresponds to the preference parameter PP. The (N+1)-th compensation curve represents a relationship between the input image II having intensity between 0 and A, and the compensated images CI having intensity between 0 and S*A. S is a scaling ratio. If S is greater than 1, the (N+1)-th compensation curve may have an up-sizing characteristic. If S is less than 1, the (N+1)-th compensation curve may have a down-sizing characteristic.

In FIG. 3A, the (N+1)-th compensation curve is represented as five vectors (VA1, VA2, VA3, VA4, and VA5). In FIG. 3B, the (N+1)-th compensation curve is represented as seven vectors VB1, VB2, VB3, VB4, VB5, VB6, and VB7. The (N+1)-th compensation curve may be represented as less than 5 vectors or more than 7 vectors.

The first through the N-th compensation curves and the (N+2)-th through the (2N+1)-th compensation curves may be understood based on the description of the (N+1)-th compensation curve. In an example embodiment, an initial preference parameter PP may be selected as a universal preference parameter for general users.

FIGS. 4A and 4B are diagrams illustrating example embodiments of a preference parameter table of the preference parameter updater included in the user adaptive image compensator of FIG. 1.

Referring to FIG. 4A, a preference parameter table 141A may include a plurality of contents CONTENTS corresponding to combinations of features FEATURES that may be extracted from the input image II as indices. FIGS. 4A and 4B show a situation in which the preference parameter table 141 includes a first content entry and a second content entry as indices. The first content corresponds to a combination of the sky feature SKY and the flower feature FLOWER. The second content corresponds to a combination of the sky feature SKY, the face feature FACE, and the plant feature PLANT.

In FIG. 4A, the preference parameter table 141A may store a first content preference parameter $P_1$ corresponding to the first content entry. The preference parameter table 141 may store a second content preference parameter $P_2$ corresponding to the second content entry. The preference parameter table 141A may store additional content preference parameters other than the first and second content preference parameters $P_1$ and $P_2$ that are depicted in FIG. 4A.

The preference parameter updater 140 may store an updated preference parameter as a content preference parameter of a content corresponding to the extracted features in the preference parameter table 141. The preference parameter updater 140 may read the content preference parameter corresponding to the extracted features from the preference parameter table 141 and may output the content preference parameter as the preference parameter PP.

In FIG. 4B, the preference parameter table 141B may store the sky feature SKY included in a first content entry as a first content sky feature preference parameter $P_{1S}$ and may store the flower feature FLOWER included in the first content entry as a first content flower feature preference parameter $P_{1F}$. The first content sky feature preference parameter $P_{1S}$ and the first content flower feature preference parameter $P_{1F}$ of FIG. 4B may correspond to the first content entry preference parameter $P_1$ of FIG. 4A. The preference parameter table 141B may store the sky feature SKY included in the second content entry as a second content sky feature preference parameter $P_{2S}$, may store the face feature FACE included in the second content entry as the second content face feature preference parameter $P_{2F}$, and may store the plant feature PLANT included in the second content entry as the second content plant feature preference parameter $P_{2P}$. The second content sky feature preference parameter $P_{1S}$, the second content face feature preference parameter $P_{2F}$, and the second content plant feature preference parameter $P_{2P}$ may correspond to the second content preference parameter $P_2$ of FIG. 4A.

Figure 5B:
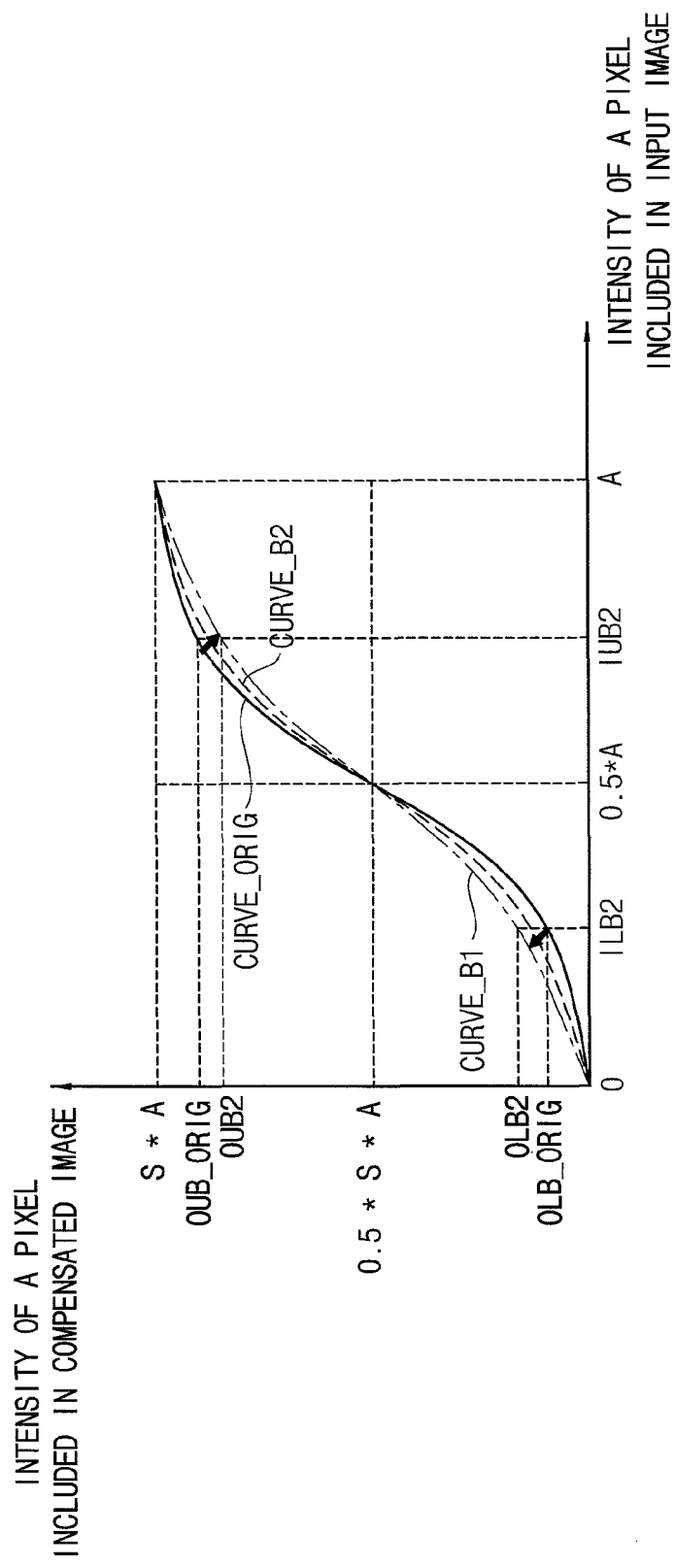

FIGS. 5A and 5B are graphs illustrating compensation curves applied to the compensated images of FIG. 1 according to an example embodiment.

FIGS. 5A and 5B shows a case in which N is 2, the K-th dynamic range, in which K is a natural number equal to or less than 5, is a ratio of maximum intensity to minimum intensity of data included in the K-th compensated image and in which the K-th dynamic range is proportional to K. In another example embodiment, N may be a natural number other than 2.

Referring to FIG. 5A, the compensated image generator 120 may generate the fourth compensated preference parameter corresponding to the fourth compensation curve CURVE_A2 and the fifth compensated preference parameter corresponding to the fifth compensation curve CURVE_A1 based on the third compensated preference parameter having value of the preference parameter PP corresponding to the third compensation curve CURVE_ORIG.

The compensated image generator 120 may generate a compensated image including data having a maximum intensity OUB_ORIG and a minimum intensity OLB_ORIG by compensating the input image II including data having a maximum intensity IUB1 and a minimum intensity ILB1 according to the third compensation curve CURVE_ORIG. The compensated image generator 120 may generate a compensated image including a data having a maximum intensity OUB1 and a minimum intensity OLB1 by compensating the input image II including data having a maximum intensity IUB1 and a minimum intensity ILB1 according to the fifth compensation curve CURVE_A1. The fourth compensation curve CURVE_A2 existing between the third compensation curve CURVE_ORIG and the fifth compensation curve CURVE_A1 may be understood based on a similar description. The fifth dynamic range (OUB1/OLB1) is greater than the fourth dynamic range and the fourth dynamic range is greater than the third dynamic range (OUB_ORIG/OLB_ORIG).

Referring to FIG. 5B, the compensated image generator 120 may generate the first compensated preference parameter corresponding to the first compensation curve CURVE_B1 and the second compensated preference parameter corresponding to the second compensation curve CURVE_B2 based on the third compensated preference parameter having value of the preference parameter PP corresponding to the third compensation curve CURVE_ORIG.

The compensated image generator 120 may generate a compensated image including data having a maximum intensity OUB_ORIG and a minimum intensity OLB_ORIG by compensating the input image II including a data having a maximum intensity IUB2 and a minimum intensity ILB2 according to the third compensation curve CURVE_ORIG. The compensated image generator 120 may generate a compensated image including data having a maximum intensity OUB2 and a minimum intensity OLB2 by compensating the input image II including a data having a maximum intensity IUB2 and a minimum intensity ILB2 according to the first compensation curve CURVE_B1. The second compensation curve CURVE_B2 existing between the first compensation curve CURVE_B1 and the third compensation curve CURVE_ORIG may be understood based on a similar description. The first dynamic range (OUB2/OLB2) is less than the second dynamic range and the second dynamic range is less than the third dynamic range (OUB_ORIG/OLB_ORIG).

Referring to FIGS. 5A and 5B, the compensated image generator 120 may generate the first through the fifth compensated images by respectively applying the first through the fifth compensation curves CURVE_B1, CURVE_B2, CURVE_ORIG, CURVE_A2, and CURVE_A1 to the input image II. As a result, if the input image II is compensated to the first compensated image, the first compensated image has the smallest dynamic range and of the input image II is compensated to the fifth compensated image, the fifth compensated image has the largest dynamic range.

Figure 6A:
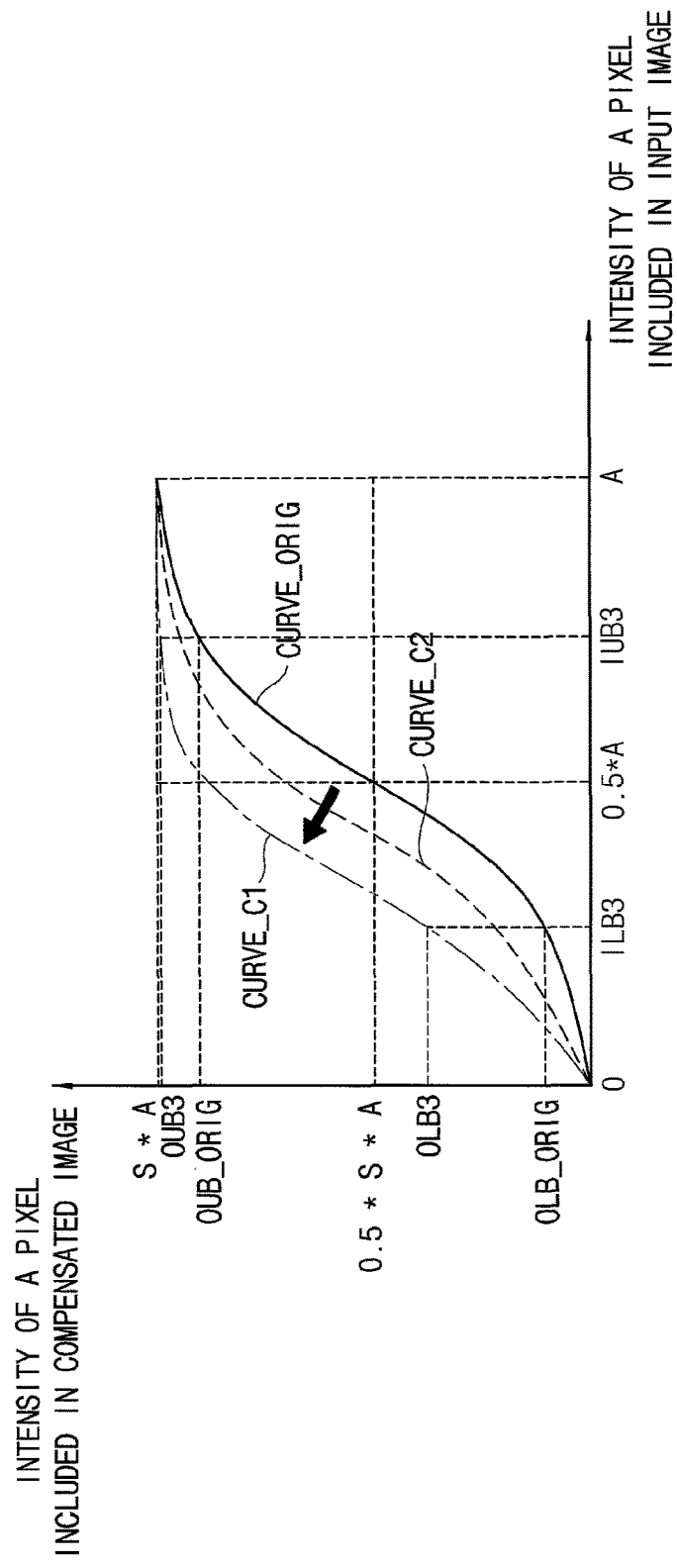
FIGS. 6A and 6B are graphs illustrating compensation curves applied to the compensated images of FIG. 1 according to another example embodiment.
Figure 6B:
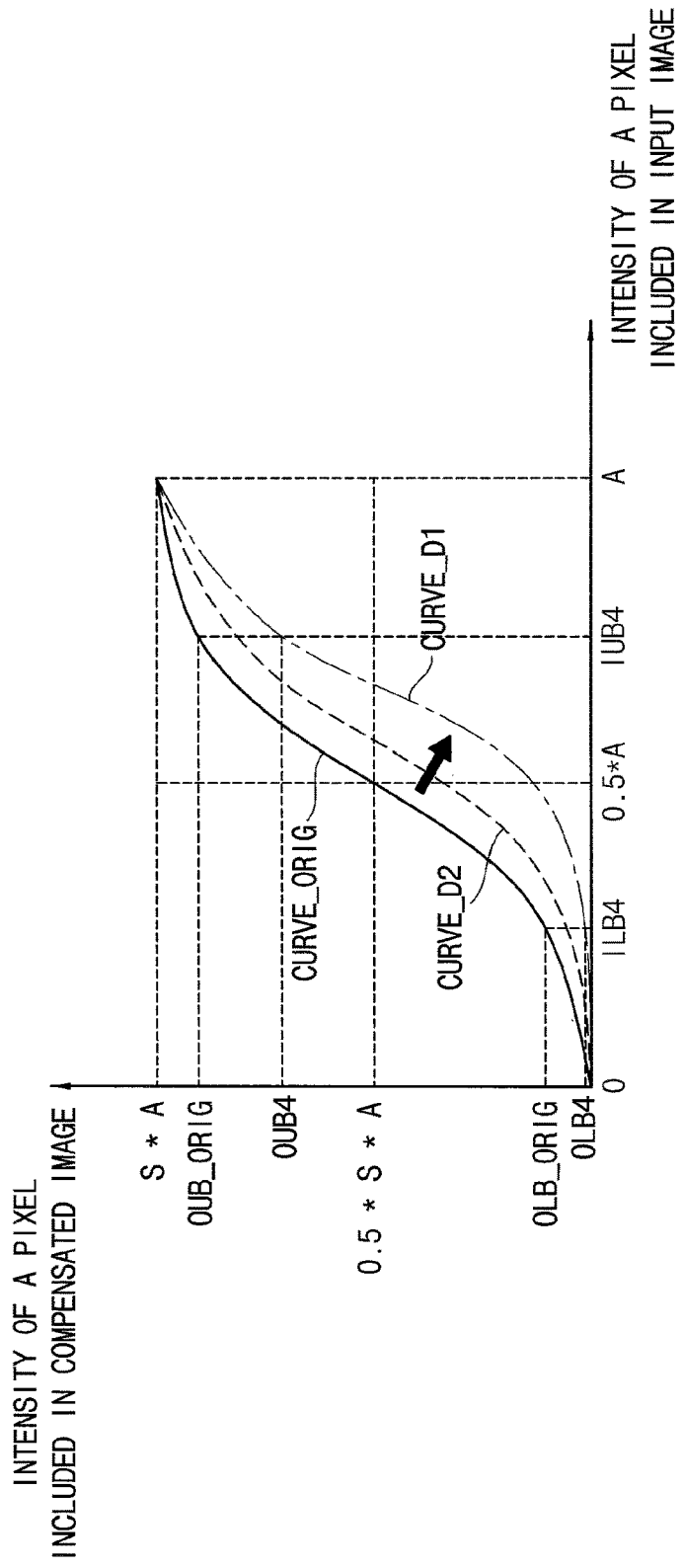

FIGS. 6A and 6B are graphs illustrating compensation curves applied to the compensated images of FIG. 1 according to another example embodiment.

FIGS. 6A and 6B shows a case in which N is 2, the K-th compensated image, in which K is a natural number equal to or less than 5, is further compensated to a black color according to the K-th compensation curve as K decreases, and the K-th compensated image is further compensated to a white color according to the K-th compensation curve as K increases. In another example embodiment, N may be a natural number other than 2.

Referring to FIG. 6A, the compensated image generator 120 may generate the fourth compensated preference parameter corresponding to the fourth compensation curve CURVE_C2 and the fifth compensated preference parameter corresponding to the fifth compensation curve CURVE_C1 based on the third compensated preference parameter having value of the preference parameter PP corresponding to the third compensation curve CURVE_ORIG.

The compensated image generator 120 may generate a compensated image including data having a maximum intensity OUB_ORIG and a minimum intensity OLB_ORIG by compensating the input image II including data having a maximum intensity IUB3 and a minimum intensity ILB3 according to the third compensation curve CURVE_ORIG. The compensated image generator 120 may generate a compensated image including a data having a maximum intensity OUB3 and a minimum intensity OLB3 by compensating the input image II including data having a maximum intensity IUB3 and a minimum intensity ILB3 according to the fifth compensation curve CURVE_C1. The fourth compensation curve CURVE_C2 existing between the third compensation curve CURVE_ORIG and the fifth compensation curve CURVE_C1 may be understood based on a similar description. The fifth compensation curve CURVE_C1 is closer to a white color than the fourth compensation curve CURVE_C2, and the fourth compensation curve CURVE_C2 is closer to a white color than the third compensation curve CURVE_ORIG.

Referring to FIG. 6B, the compensated image generator 120 may generate the first compensated preference parameter corresponding to the first compensation curve CURVE_D1 and the second compensated preference parameter corresponding to the second compensation curve CURVE_D2 based on the third compensated preference parameter having value of the preference parameter PP corresponding to the third compensation curve CURVE_ORIG.

The compensated image generator 120 may generate a compensated image including data having a maximum intensity OUB_ORIG and a minimum intensity OLB_ORIG by compensating the input image II including data having a maximum intensity IUB4 and a minimum intensity ILB4 according to the third compensation curve CURVE_ORIG. The compensated image generator 120 may generate a compensated image including data having a maximum intensity OUB4 and a minimum intensity OLB4 by compensating the input image II including data having a maximum intensity IUB4 and a minimum intensity ILB4 according to the first compensation curve CURVE_D1. The second compensation curve CURVE_D2 existing between the first compensation curve CURVE_D1 and the third compensation curve CURVE_ORIG may be understood based on a similar description. The first compensation curve CURVE_D1 is closer to a black color than the second compensation curve CURVE_D2, and the second compensation curve CURVE_D2 is closer to a black color than the third compensation curve CURVE_ORIG.

Referring to FIGS. 6A and 6B, the compensated image generator 120 may generate the first through the fifth compensated images by respectively applying the first through the fifth compensation curves CURVE_D1, CURVE_D2, CURVE_ORIG, CURVE_C2, and CURVE_C1 to the input image II. As a result, if the input image II is compensated to the first compensated image, the first compensated image is closest to a black color and if the input image II is compensated to the fifth compensated image, fifth compensated image is closest to a white color.

Figure 7:
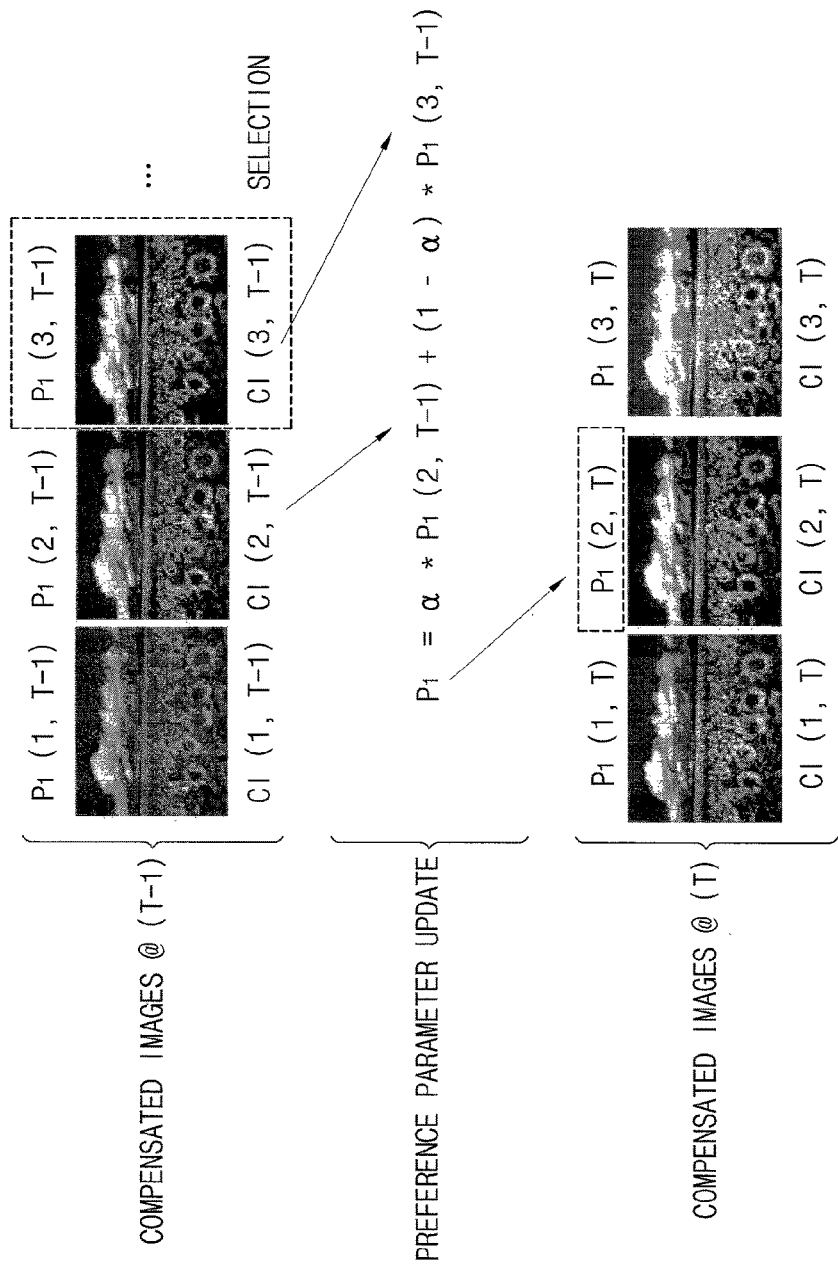
FIG. 7 is a diagram illustrating operation of the preference parameter updater included in the user adaptive image compensator of FIG. 1.

FIG. 7 is a diagram illustrating operation of the preference parameter updater included in the user adaptive image compensator of FIG. 1.

FIG. 7 shows operation of the compensated image generator 120 and the preference parameter updater 140 when the (T−1)-th input image having the sky feature SKY and the flower feature FLOWER and T-th input image having the sky feature SKY and the flower feature FLOWER are sequentially inputted to the compensated image generator 120 and N is 1.

When the (T−1)-th input image is inputted to the compensated image generator 120, the preference parameter updater 140 outputs the first content preference parameter P1 of the first content corresponding to the sky feature SKY and the flower feature FLOWER according to the preference parameter table 141A as the preference parameter PP.

The compensated image generator 120 generates the second compensated preference parameter $P_1(2, T-1)$ having the preference parameter PP and generates the first and third compensated preference parameters $P_1(1, T-1)$ and $P_1(3, T-1)$ by modifying the preference parameter PP.

In an example embodiment, the first through third compensation curves corresponding to the first through third compensated preference parameters $P_1(1, T-1)$, $P_1(2, T-1)$, and $P_1(3, T-1)$ may be respectively generated by changing the dynamic range changing as described in reference to FIGS. 5A and 5B. In another example embodiment, the first through the third compensation curves corresponding to the first through the third compensated preference parameters $P_1(1, T-1)$, $P_1(2, T-1)$, and $P_1(3, T-1)$ may be generated by shifting the color as described in reference to FIGS. 6A and 6B. In still another example embodiment, the first through the third compensation curves corresponding to the first through the third compensated preference parameters $P_1(1, T-1)$, $P_1(2, T-1)$, and $P_1(3, T-1)$ may be generated by another technique that is different from the technique described in reference to FIGS. 5A through 6B.

The compensated image generator 120 may generate the first compensated image CI(1, T−1) by applying the first compensated preference parameter $P_1(1, T-1)$ to the (T−1)-th input image. The compensated image generator 120 may generate the second compensated image CI(2, T−1) by applying the second compensated preference parameter $P_1(2, T-1)$ to the (T−1)-th input image. The compensated image generator 120 may generate the third compensated image CI(3, T−1) by applying the third compensated preference parameter $P_1(3, T-1)$ to the (T−1)-th input image.

If the user selects the third compensated image CI(3, T−1), the image selector 130 outputs the third compensated preference parameter $P_1(3, T-1)$ corresponding to the third compensated image CI(3, T−1) as the selected compensated preference parameter SCPP. The preference parameter updater 140 updates the preference parameter $P_1(2, T)$ as value generated by combining the preference parameter $P_1(2, T-1)$ and the selected compensated preference parameter $P_1(3, T-1)$ according to Equation 1 based on a value of a learning speed α which is between 0 and 1. If the value of the learning speed α is close to 0, the changing rate of the preference parameter PP is slow. If the value of the learning speed α is close to 1, the changing rate of the preference parameter PP is fast.

$$P_1 = \alpha * P_1(2, T-1) + (1-\alpha) * P_1(3, T-1) \qquad (1)$$

The preference parameter updater 140 stores the combined value $P_1$ generated by Equation 1 as the first content preference parameter $P_1$ of the preference parameter table 141A of FIG. 4A.

When the T-th input image is input to the compensated image generator 120, the preference parameter updater 140 outputs the first content preference parameter $P_1$ of the first content corresponding to the sky feature SKY and the flower feature FLOWER according to the preference parameter table 141A as the preference parameter PP.

The compensated image generator 120 generates the fifth compensated preference parameter $P_2(2, T)$ having the preference parameter PP and generates the fourth and sixth compensated preference parameters $P_2(1, T)$ and $P_2(3, T)$P2 (3, T) by modifying the preference parameter PP. A technique of generating the fourth through sixth compensated preference parameters $P_2(1, T)$, $P_2(2, T)$, and $P_2(3, T)$ may be understood based on the preceding description.

The compensated image generator 120 may generate the fourth compensated image CI(1, T) by applying the fourth compensated preference parameter $P_2(1, T)P2(1, T)$ to the T-th input image. The compensated image generator 120 may generate the fifth compensated image CI(2, T) by applying the fifth compensated preference parameter $P_2(2, T)$ to the T-th input image. The compensated image generator 120 may generate the sixth compensated image CI(3, T) by applying the sixth compensated preference parameter $P_2(3, T)$ to the T-th input image. The user may select one among the fourth through sixth compensated images CI(1, T), CI(2, T), and CI(3, T). Subsequent operations may repeat the operations that have been described.

Figure 8:
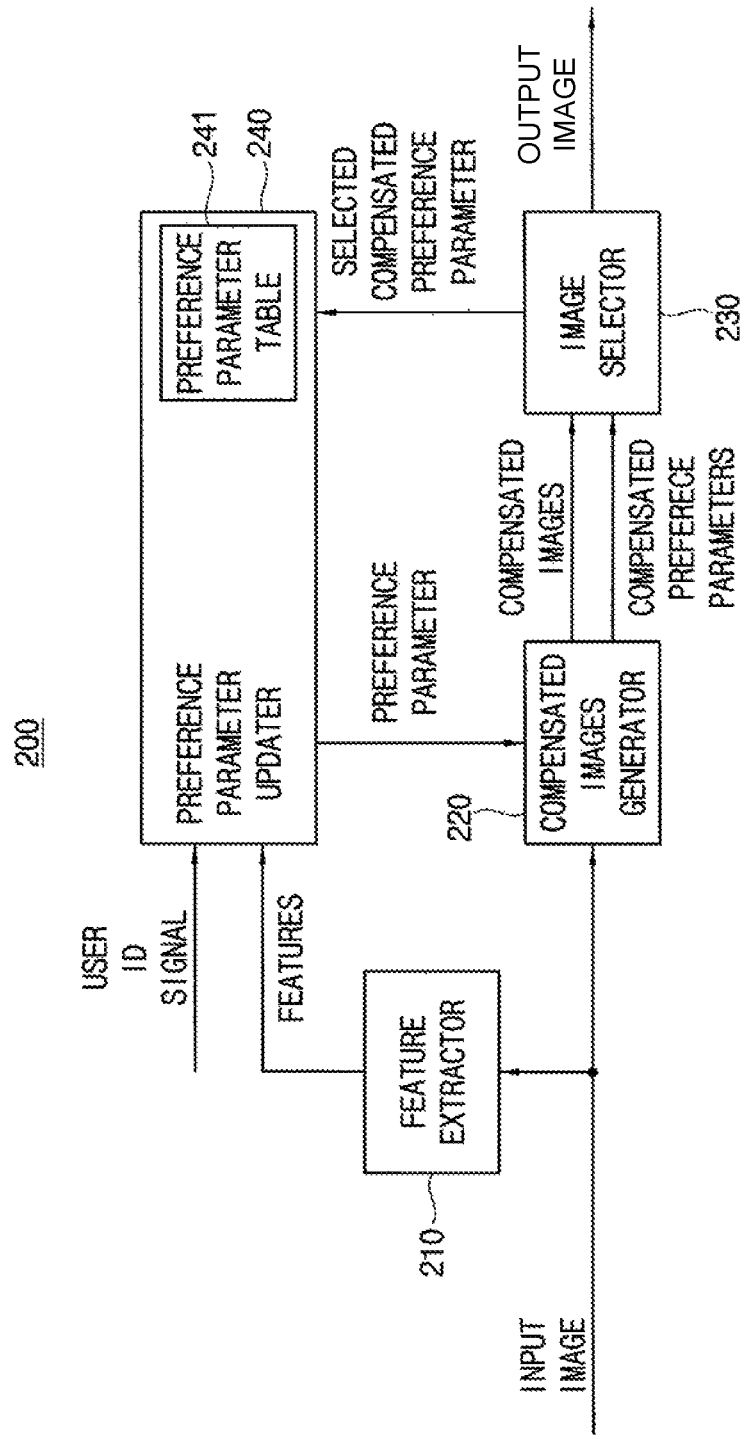
FIG. 8 is a block diagram illustrating a user adaptive image compensator according to another example embodiment.

FIG. 8 is a block diagram illustrating a user adaptive image compensator according to another example embodiment.

Referring to FIG. 8, a user adaptive image compensator 200 includes a feature extractor 210, a compensated image generator 220, an image selector 230, and a preference parameter updater 240.

The feature extractor 210 extracts features FEATURES from an input image INPUT IMAGE (II). The compensated image generator 220 generates compensated preference parameters (COMPENSATED PREFERENCE PARAMETERS (CPP)) based on an identification signal USER ID SIGNAL (UIS) of a current user among a plurality of users and a preference parameter PREFERENCE PARAMETER (PP) corresponding the extracted features. The compensated image generator 220 generates a plurality of compensated images COMPENSATED IMAGES (CI) by compensating the input image II based on the compensated preference parameters CPP. The image selector 230 displays the compensated images CI to the current user. The image selector 230 outputs a selected compensated image, which is selected among the compensated images CI by the current user, as an output image OUTPUT IMAGE (OI). The image selector 230 outputs a selected compensated preference parameter SCPP, which corresponds to the selected compensated image, among the compensated preference parameters CPP. The preference parameter updater 240 updates the preference parameter PP based on the selected compensated preference parameter SCPP, the extracted features, and the identification signal UIS.

The preference parameter updater 240 may include a preference parameter table 241. The preference parameter table 241 will be described with the references to FIGS. 9A and 9B.

FIGS. 9A and 9B are diagrams illustrating example embodiments of the preference parameter table of the preference parameter updater included in the user adaptive image compensator of FIG. 8.

Referring to FIG. 9A, the preference parameter table 241A may include a plurality of content entries CONTENTS corresponding to features that may be extracted from the input image II and the identification signal UIS of the users as indices. FIG. 9A shows a situation in which the preference parameter table 241A includes two content entries for each of two users. In an example embodiment, the preference parameter table 241A may include more content entries for each user and may include more users than two. In another example embodiment, the preference parameter table 241A may include fewer content entries for each users and may include fewer users than two.

In FIG. 9A, the preference parameter table 241A may include a first user content preference parameter $P_{11}$ corresponding to a first user and a first content entry corresponding to a combination of the sky feature SKY and the flower feature FLOWER. The preference parameter table 241A may include a second user content preference parameter $P_{12}$ corresponding to the first user and a second content entry corresponding to a combination of the sky feature SKY, the face feature FACE, and the plant feature PLANT. The preference parameter table 241A may include a third user content preference parameter $P_{21}$ corresponding to a second user and the first content entry corresponding to a combination of the sky feature SKY and the flower feature FLOWER. The preference parameter table 241A may include a fourth user content preference parameter $P_{22}$ corresponding to the second user and the second content entry corresponding to a combination of the sky feature SKY, the face feature FACE, and the plant feature PLANT. The preference parameter table 241A may include additional users, content entries, and user content preference parameters that are not shown.

The preference parameter updater 240 may store an updated preference parameter as a user content preference parameter corresponding to a combination of the identification signal UIS and a content corresponding to the extracted features in the preference parameter table 241A. The preference parameter updater 240 may read the user content preference parameter corresponding to the extracted features and the identification signal UIS from the preference parameter table 241A, and output the user content preference parameter as the preference parameter PP.

Referring to FIG. 9B, the preference parameter table 241B may include a plurality of content entries corresponding to features that may be extracted from the input image II and the identification signal UIS of the users as indices. In particular, FIG. 9B shows a configuration in which the preference parameter table 241B includes more than two content entries for each of two users and in which the content entries are combinations of features that are extracted from the input image II. In an example embodiment, the preference parameter table 241B may include more content entries for each user than depicted in FIG. 9B and may include entries for more than two users. In another example embodiment, the preference parameter table 241B may include fewer content entries for each user and may include fewer than two users.

In FIG. 9B, for a first user, the preference parameter table 241B may include a first user content preference parameter $P_{11S}$ for a first content entry corresponding to a sky feature SKY and a second user content preference parameter $P_{11F}$ for a second content entry corresponding to a flower feature FLOWER. The preference parameter table 241B may also include for the first user a third user content preference parameter $P_{12S}$ corresponding to the sky feature SKY, a fourth user content preference parameter $P_{12F}$ corresponding to the face feature FACE, and a fifth user content preference parameter $P_{12P}$ corresponding to the plant feature PLANT. For a second user, the preference parameter table 241A may include a first user content preference parameter $P_{21S}$ corresponding to the sky feature SKY, a second user content preference parameter $P_{22F}$ corresponding to the flower feature FLOWER. The preference table 241B may also include for the second user a third user content preference parameter $P_{22S}$ corresponding to the sky feature SKY, a fourth user content preference parameter $P_{22F}$ corresponding to the face feature FACE, and a fifth user content preference parameter $P_{22P}$ corresponding to the plant feature PLANT.

The preference parameter updater 240 may store an updated preference parameter as a user content preference parameter corresponding to a combination of the identification signal UIS and a content corresponding to the extracted features in the preference parameter table 241B. The preference parameter updater 240 may read the user content preference parameter corresponding to the extracted features and the identification signal UIS from the preference parameter table 241B, and output the user content preference parameter as the preference parameter PP.

Figure 10:
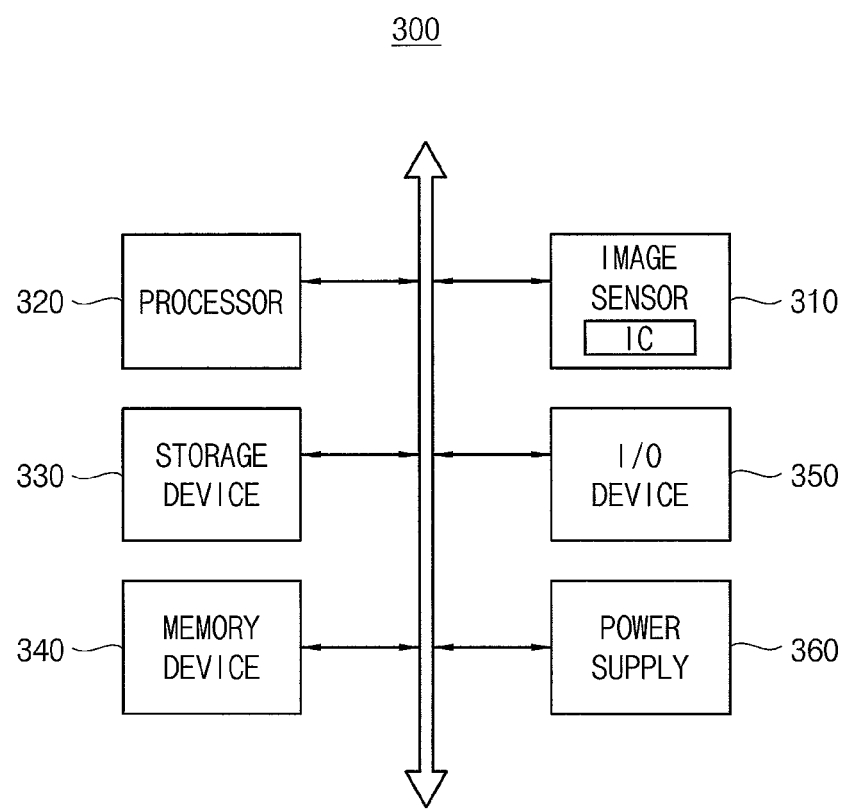
FIG. 10 is a block diagram illustrating a computing system according to an example embodiment.

FIG. 10 is a block diagram illustrating a computing system according to an example embodiment.

Referring to FIG. 10, a computing system 300 may include an image sensor 310, a processor 320 and a storage device 330.

The image sensor 310 may generate a digital signal corresponding to an incident light. In an example embodiment, the image sensor 310 may include an image compensator IC generating the digital signal by compensating a signal generated from the incident light. The image compensator IC may be implemented as one of the user adaptive image compensators 100 and 200 of FIGS. 1 and 8. In another example embodiment, the image compensator IC may be implemented in the processor 320 to compensate an image stored in the storage device 330. The storage device 330 may store the digital signal. The processor 320 may control operations of the image sensor 310 and the storage device 330.

The computing system 300 may further include a memory device 340, an input/output device 350 and a power supply 360. Although it is not illustrated in FIG. 10, the computing system 300 may further include ports that communicate with a video card, a sound card, a memory card, a universal serial bus (USB) device, or other electronic devices.

The processor 320 may perform various calculations or tasks. According to some embodiments, the processor 320 may be a microprocessor or a CPU. The processor 320 may communicate with the storage device 330, the memory device 340 and the input/output device 350 via an address bus, a control bus, and/or a data bus. In some example embodiments, the processor 320 may be coupled to an extended bus, such as a peripheral component interconnection (PCI) bus.

The storage device 330 may include a non-volatile memory device, such as a flash memory device, a solid-state drive (SSD), a hard disk drive (HDD), a compact disk read-only memory (CD-ROM) drive, etc.

The memory device 340 may store data required for an operation of the electronic device 300. The memory device 340 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 350 may include a keyboard, a mouse, a printer, a display device, etc. The power supply 360 may supply operational power.

The image sensor 310 may include a pixel array that detects incident light to generate an analog signal, and an analog-digital conversion unit that performs a sigma-delta analog-digital conversion and a cyclic analog-digital conversion with respect to the analog signal to generate a digital signal in a first operation mode and performs a single-slope analog-digital conversion with respect to the analog signal to generate the digital signal in a second operation mode.

The image sensor 310 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to example embodiments, the image sensor 310 may be integrated with the processor 320 in one chip, or the image sensor 310 and the processor 320 may be implemented as separate chips.

The computing system 300 may be any computing system using an image sensor. For example, the computing system 300 may include a digital camera, a mobile phone, a smart phone, a portable multimedia player (PMP), a personal digital assistant (PDA), etc.

Figure 11:
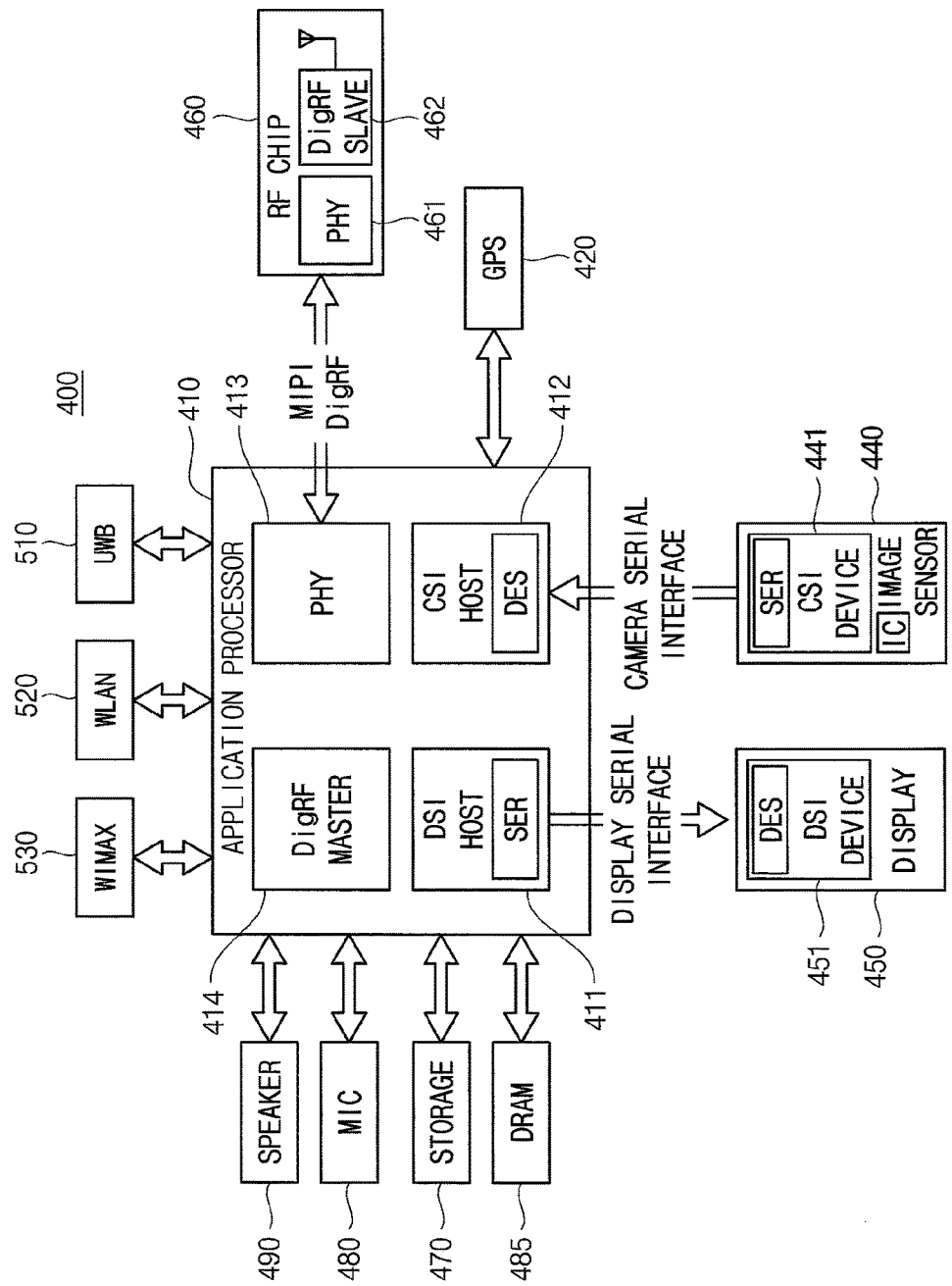
FIG. 11 is a block diagram illustrating an example embodiment of interface used in the computing system of FIG. 10.

FIG. 11 is a block diagram illustrating an example embodiment of interface used in the computing system of FIG. 10.

Referring to FIG. 11, a computing system 400 may be implemented by a data processing device (e.g., a cellular phone, a personal digital assistant, a portable multimedia player, a smart phone, etc.) that uses or supports a mobile industry processor interface (MIPI) interface. The computing system 400 may include an application processor 410, an image sensor 440, a display device 450, etc.

A CSI host 412 of the application processor 410 may perform a serial communication with a CSI device 441 of the image sensor 440 via a camera serial interface (CSI). In some embodiments, the CSI host 412 may include a deserializer (DES), and the CSI device 441 may include a serializer (SER). In an example embodiment, the image sensor 440 may include an image compensator IC generating the digital signal by compensating a signal generated from the incident light. The image compensator IC may be implemented as one of the user adaptive image compensators 100 and 200 of FIGS. 1 and 8. In another example embodiment, the image compensator IC may be implemented in the application processor 410 to compensate an image stored in the storage device 470.

A DSI host 411 of the application processor 410 may perform a serial communication with a DSI device 451 of the display device 450 via a display serial interface (DSI). In some example embodiments, the DSI host 411 may include a serializer (SER), and the DSI device 451 may include a deserializer (DES).

The computing system 400 may further include a radio frequency (RF) chip 460 performing a communication with the application processor 410. A physical layer (PHY) 413 of the computing system 400 and a physical layer (PHY) 461 of the RF chip 460 may perform data communications based on a MIPI DigRF. The application processor 410 may further include a DigRF MASTER 414 that controls the data communications according to the MIPI DigRF of the PHY 461, and the RF chip 460 may further include a DigRF SLAVE 462 controlled by the DigRF MASTER 414.

The computing system 400 may further include a global positioning system (GPS) 420, the storage device 470, a MIC 480, a DRAM device 485, and a speaker 490. In addition, the computing system 400 may perform communications using an ultra wideband (UWB) 510, a wireless local area network (WLAN) 520, a worldwide interoperability for microwave access (WIMAX) 530, etc. However, the structure and the interface of the computing system 400 are not limited thereto.

Figure 12:
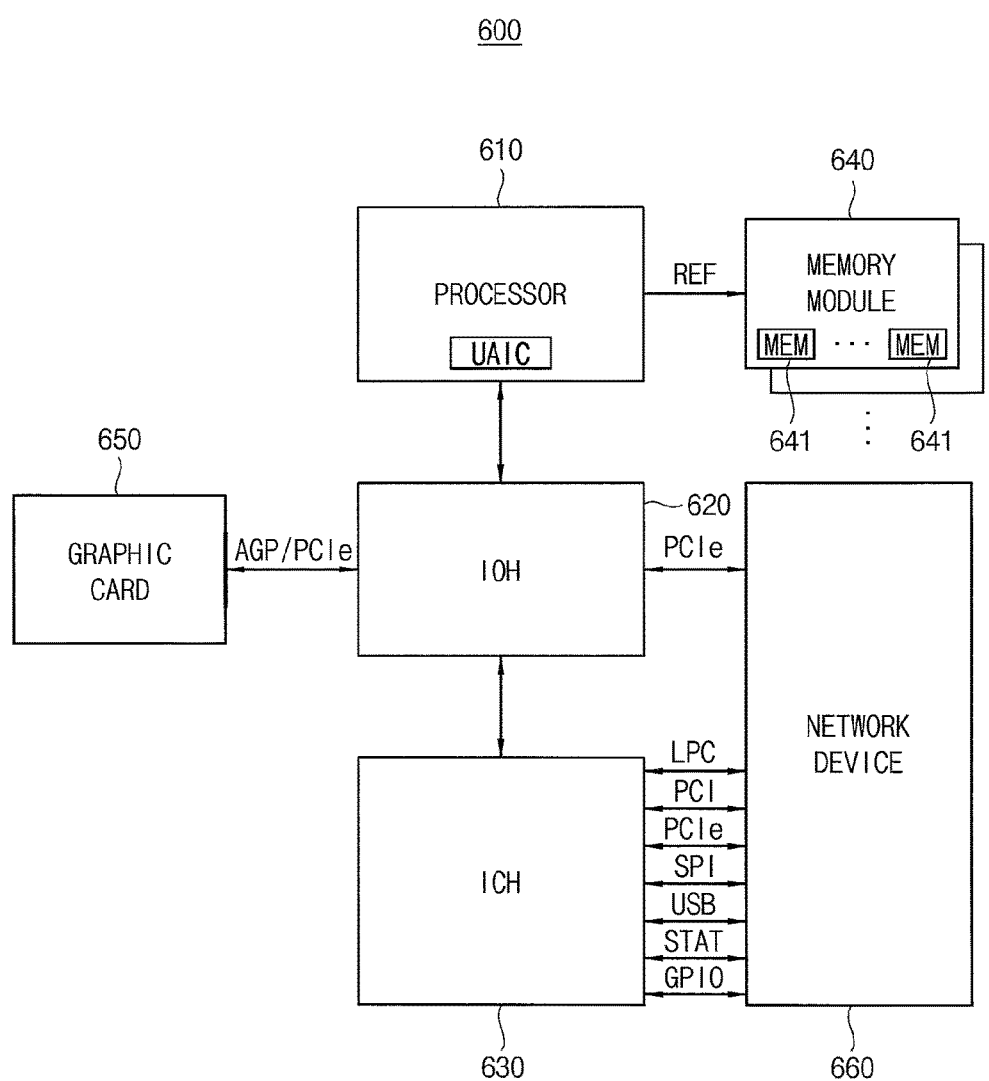
FIG. 12 is a block diagram illustrating a mobile system according to an example embodiment.

FIG. 12 is a block diagram illustrating a mobile system according to an example embodiment.

Referring to FIG. 12, a computing system 600 includes a processor 610, an input/output hub (IOH) 620, an input/output controller hub (ICH) 630, at least one memory module 640, a network device 660 and a graphics card 650. In some embodiments, the computing system 600 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 610 may perform various computing functions, such as executing specific software for performing specific calculations or tasks. For example, the processor 610 may be a microprocessor, a central process unit (CPU), a digital signal processor, or the like. In some embodiments, the processor 610 may include a single core or multiple cores. For example, the processor 610 may be a multi-core processor, such as a dual-core processor, a quad-core processor, a hexa-core processor, etc. Although FIG. 12 illustrates the computing system 600 including one processor 610, in some embodiments, the computing system 600 may include a plurality of processors.

The processor 610 may include a memory controller for controlling operations of the memory module 640. The memory controller included in the processor 610 may be referred to as an integrated memory controller (IMC). A memory interface between the memory controller and the memory module 640 may be implemented with a single channel including a plurality of signal lines, or may be implemented with multiple channels, to each of which at least one memory module 640 may be coupled. In some embodiments, the memory controller may be located inside the input/output hub 620. The input/output hub 620 including the memory controller may be referred to as memory controller hub (MCH). The processor 610 may include an image compensator UAIC to compensate an image stored in the memory module 640. The image compensator UAIC may be implemented as one of the user adaptive image compensators 100 and 200 of FIGS. 1 and 8.

The memory module 640 may include a plurality of memory devices MEM 641 that store data provided from the memory controller.

The input/output hub 620 may manage data transfer between processor 610 and devices, such as the graphics card 650. The input/output hub 620 may be coupled to the processor 610 via various interfaces. For example, the interface between the processor 610 and the input/output hub 620 may be a front side bus (FSB), a system bus, a HyperTransport, a lightning data transport (LDT), a QuickPath interconnect (QPI), a common system interface (CSI), etc. The input/output hub 620 may provide various interfaces with the devices. For example, the input/output hub 620 may provide an accelerated graphics port (AGP) interface, a peripheral component interface-express (PCIe), a communications streaming architecture (CSA) interface, etc. Although FIG. 12 illustrates the computing system 600 including one input/output hub 620, in some embodiments, the computing system 600 may include a plurality of input/output hubs.

The graphics card 650 may be coupled to the input/output hub 620 via AGP or PCIe. The graphics card 650 may control a display device for displaying an image. The graphics card 650 may include an internal processor for processing image data and an internal memory device. In some embodiments, the input/output hub 620 may include an internal graphics device along with or instead of the graphics card 650 outside the graphics card 650. The graphics device included in the input/output hub 620 may be referred to as integrated graphics. Further, the input/output hub 620 including the internal memory controller and the internal graphics device may be referred to as a graphics and memory controller hub (GMCH).

The input/output controller hub 630 may perform data buffering and interface arbitration to efficiently operate various system interfaces. The input/output controller hub 630 may be coupled to the input/output hub 620 via an internal bus, such as a direct media interface (DMI), a hub interface, an enterprise Southbridge interface (ESI), PCIe, etc.

The input/output controller hub 630 may provide various interfaces with peripheral devices. For example, the input/output controller hub 630 may provide a universal serial bus (USB) port, a serial advanced technology attachment (SATA) port, a general purpose input/output (GPIO), a low pin count (LPC) bus, a serial peripheral interface (SPI), PCI, PCIe, etc.

The network device 660 may receive data of the processor 610 and the graphics card 650 through the PCI express of the input/output hub 620 or one of the USB port, the SATA port, the GPIO, the LPC bus, the SPI, the PCI, and the PCIe. The network device 660 may transmit the data to the other computing system. The network device 660 may receive other data from the other computing system.

In some embodiments, the processor 610, the input/output hub 620 and the input/output controller hub 630 may be implemented as separate chipsets or separate integrated circuits. In other embodiments, at least two of the processor 610, the input/output hub 620 and the input/output controller hub 630 may be implemented as a single chipset.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A user adaptive image compensator, comprising:
a feature extractor configured to extract features from an input image;
a compensated image generator to receive the input image and configured to generate compensated preference parameters based on a preference parameter, the compensated image generator configured to generate a plurality of compensated images of the input image based on the generated compensated preference parameters;
an image selector configured to display the plurality of compensated images to a user, receive from the user a selection input for a selected compensated image, and generate in response to the selection input the selected compensated image as an output image, the image selector being further configured to output a selected compensated preference parameter that corresponds to the selected compensated image; and a preference parameter updater coupled to the image selector and the feature extractor, the preference parameter updater being configured to update the preference parameter based on the selected compensated preference parameter and the extracted features received from the feature extractor, the preference parameter updater being further configured to output the preference parameter to the compensated image generator, wherein the plurality of the compensated images include first through (2N+1)-th compensated images, in which N is a natural number, and the compensated preference parameters include first through (2N+1)-th compensated preference parameters, wherein the compensated image generator generates the (N+1)-th compensated preference parameter having a value of the preference parameter respectively corresponding to a (N+1)-th compensation curve, wherein the compensated image generator generates a first through an N-th compensated preference parameters corresponding to a first through an N-th compensation curves and an (N+2)-th through an (2N+1)-th compensated preference parameters corresponding to the (N+2)-th through (2N+1)-th compensation curves based on the preference parameter, and wherein the compensated image generator generates the first through (2N+1)-th compensated images by respectively applying the first through (2N+1)-th compensation curves to the input image.

2. The user adaptive image compensator of claim 1, wherein a K-th dynamic range, in which K is a natural number equal to or less than (2N+1), is a ratio of a maximum intensity to a minimum intensity of data included in the K-th compensated image, and wherein the K-th dynamic range is proportional to K.

3. The user adaptive image compensator of claim 1, wherein a K-th compensated image, in which K is a natural number equal to or less than N, is further compensated to a black color according to the K-th compensation curve in comparison to the (N+1)-th compensated image as K decreases, and wherein an L-th compensated image, in which L is a natural number that is equal to or greater than (N+2) and that is equal to or less than (2N+1), is further compensated to a white color according to the L-th compensation curve in comparison to the (N+1)-th compensation image as L increases.

4. The user adaptive image compensator of claim 1, wherein if the user selects a K-th compensated image, in which K is a natural number equal to or less than (2N+1), the image selector outputs a compensated preference parameter corresponding to the K-th compensation curve as the selected compensated preference parameter, and the preference parameter updater updates the preference parameter as a value generated by combining the preference parameter and the selected compensated preference parameter based on a value of a learning speed α.

5. The user adaptive image compensator of claim 1, wherein the preference parameter updater includes a preference parameter table, wherein the preference parameter table includes a plurality of content entries corresponding to combinations of features that may be extracted from the input image as indices, and wherein the preference parameter table stores content preference parameters corresponding to the extracted features.

6. The user adaptive image compensator of claim 1, wherein a type and a number of the extracted features vary according to the input image.

7. The user adaptive image compensator of claim 1, wherein the extracted features are features of a portion of the input image, or are features based on an entirety of the input image.

8. The user adaptive image compensator of claim 1, wherein the preference parameter includes vectors representing a compensation curve describing a preference of the user.

9. A user adaptive image compensator, comprising:
a feature extractor configured to extract features from an input image;
a compensated image generator to receive the input image and configured to generate compensated preference parameters based on an identification signal of a current user among a plurality of users and a preference parameter corresponding the extracted features, the compensated image generator configured to generate a plurality of compensated images by compensating the input image based on the compensated preference parameters;
an image selector configured to display the plurality of compensated images to the current user, receive from the current user a selection input for a selected compensated image, and generate in response to the selection input the selected compensated image as an output image, the image selector being further configured to output a selected compensated preference parameter from the compensated preference parameters and that corresponds to the selected compensated image; and
a preference parameter updater coupled to the image selector and the feature extractor, the preference parameter updater being configured to update the preference parameter based on the selected compensated preference parameter, the extracted features received from the feature extractor, and the identification signal, the preference parameter updater being further configured to output the preference parameter to the compensated image generator, wherein the plurality of the compensated images include first through (2N+1)-th compensated images, in which N is a natural number, and the compensated preference parameters include first through (2N+1)-th compensated preference parameters, wherein the compensated image generator generates the (N+1)-th compensated preference parameter having a value of the preference parameter respectively corresponding to a (N+1)-th compensation curve, wherein the compensated image generator generates a first through an N-th compensated preference parameters corresponding to a first through an N-th compensation curves and an (N+2)-th through an (2N+1)-th compensated preference parameters corresponding to the (N+2)-th through (2N+1)-th compensation curves based on the preference parameter, and wherein the compensated image generator generates the first through (2N+1)-th compensated images by respectively applying the first through (2N+1)-th compensation curves to the input image.

10. A user adaptive image compensator, comprising:
a feature extractor to extract features from an input image;
a compensated image generator to receive the input image and to generate at least one compensated preference parameter based on a current preference parameter, the compensated image generator generating a plurality of compensated images of the input image based on the at least one generated compensated preference parameter;

an image selector to display the plurality of compensated images, receive from a user a selection input for a selected compensated image, and generate in response to the selection input the selected compensated image as an output image from the plurality of displayed compensated images, the image selector being further to output a compensated preference parameter that corresponds to the selected compensated image; and a preference parameter updater coupled to the image selector and the feature extractor, the preference parameter updater being to update the current preference parameter based on the extracted features received from the feature extractor and the compensated preference parameter that corresponds to the selected compensated image received from the image selector, the preference parameter updater being further configured to output the current preference parameter to the compensated image generator, wherein the plurality of the compensated images include first through (2N+1)-th compensated images, in which N is a natural number, wherein the compensated preference parameters include first through (2N+1)-th compensated preference parameters, wherein the compensated image generator is to further generate the (N+1)-th compensated preference parameter having a value of the preference parameter corresponding to a (N+1)-th compensation curve, wherein the compensated image generator is to further generate a first through an N-th compensated preference parameters corresponding to a first through an N-th compensation curves and an (N+2)-th through an (2N+1)-th compensated preference parameters respectively corresponding to the (N+2)-th through (2N+1)-th compensation curves based on the preference parameter, and wherein the compensated image generator is to further generate the first through (2N+1)-th compensated images by respectively applying the first through (2N+1)-th compensation curves to the input image.

11. The user adaptive image compensator of claim 10, wherein a K-th dynamic range, in which K is a natural number equal to or less than (2N+1), is a ratio of a maximum intensity to a minimum intensity of data included in the K-th compensated image, and wherein the K-th dynamic range is proportional to K.

12. The user adaptive image compensator of claim 10, wherein a K-th compensated image, in which K is a natural number equal to or less than N, is further compensated to a black color according to the K-th compensation curve in comparison to the (N+1)-th compensated image as K decreases, and wherein an L-th compensated image, in which L is a natural number that is equal to or greater than (N+2) and that is equal to or less than (2N+1), is further compensated to a white color according to the L-th compensation curve compared to the (N+1)-th compensation image as L increases.

13. The user adaptive image compensator of claim 10, wherein if the user selects a K-th compensated image, in which K is a natural number equal to or less than (2N+1), the image selector is to further output a compensated preference parameter corresponding to the K-th compensation curve as a selected compensated preference parameter, and the preference parameter updater is to further update the current preference parameter to be a value generated by combining the preference parameter and the selected compensated preference parameter based on a learning speed value a.

14. The user adaptive image compensator of claim 10, wherein the preference parameter updater includes a preference parameter table, wherein the preference parameter table includes a plurality of content entries corresponding to combinations of features that may be extracted from the input image as indices, and wherein the preference parameter table is to further store content preference parameters corresponding to the extracted features.

15. The user adaptive image compensator of claim 14, wherein the preference parameter updater is to further store the updated preference parameter as a first content preference parameter of a first content entry corresponding to the extracted features in the preference parameter table, and wherein the preference parameter updater is to further read the first content preference parameter corresponding to the extracted features from the preference parameter table and output the first content preference parameter as the current preference parameter.

16. The user adaptive image compensator of claim 10, wherein a type and a number of the extracted features vary according to the input image.

17. The user adaptive image compensator of claim 10, wherein the extracted features are features of a portion of the input image, or are features based on an entirety of the input image.

18. The user adaptive image compensator of claim 10, wherein the preference parameter includes vectors representing a compensation curve that is based on a preference of the user.

* * * * *